United States Patent
Li et al.

(10) Patent No.: US 11,418,424 B2
(45) Date of Patent: Aug. 16, 2022

(54) TEST SYSTEM

(71) Applicant: BEIJING BAIDU NETCOM SCIENCE AND TECHNOLOGY CO., LTD., Beijing (CN)

(72) Inventors: Zhanxue Li, Beijing (CN); Zaidong Zhang, Beijing (CN); Tingting Che, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/208,634

(22) Filed: Mar. 22, 2021

(65) Prior Publication Data
US 2021/0226881 A1    Jul. 22, 2021

(30) Foreign Application Priority Data

May 29, 2020 (CN) .......................... 202010478440.3
May 29, 2020 (CN) .......................... 202020953487.6

(51) Int. Cl.
*H04L 12/26* (2006.01)
*H04K 3/00* (2006.01)
*H04L 43/50* (2022.01)

(52) U.S. Cl.
CPC ................ *H04L 43/50* (2013.01); *H04K 3/68* (2013.01)

(58) Field of Classification Search
CPC .................................. H04L 51/32; H04K 3/68
See application file for complete search history.

(56) References Cited

U.S. PATENT DOCUMENTS
2017/0317767 A1    11/2017    Humphrey et al.

FOREIGN PATENT DOCUMENTS

| CN | 102201950 B | * | 10/2013 | |
|---|---|---|---|---|
| CN | 105813124 A | * | 7/2016 | |
| CN | 108055171 A | | 5/2018 | |
| CN | 209105201 U | | 7/2019 | |
| JP | 2017514103 A | | 6/2017 | |
| JP | 2020016875 A | | 1/2020 | |
| WO | WO-2019071436 A1 | * | 4/2019 | ......... H04L 43/0888 |

OTHER PUBLICATIONS

Japanese Patent Office; Japanese Decision to Grant; Japanese Application No. 2021-066310; dated Feb. 28, 2022; 5 pages.

* cited by examiner

*Primary Examiner* — Christopher B Robinson
(74) *Attorney, Agent, or Firm* — Faegre Drinker Biddle & Reath LLP (57) ABSTRACT

A test system, is provided, which relates to a technical field of detection devices, and particularly to a test system of an artificial intelligence terminal. The test system comprises: a signal shielding box, a test unit, a control terminal and a server; the test unit is disposed in the signal shielding box; a router of the test unit is in wired connection with a to-be-tested terminal; the control terminal is in wired connection with the router; and the server is in wired connection with the router. Through the signal shielding box, the signal transmission between the router and the to-be-tested terminal is effectively shielded from external signals. In addition, due to the wired connections, the stability of the signal transmission is ensured, which solves existing problems of unstable signal transmission and signal crosstalk during signal transmission using wireless transmission technologies.

8 Claims, 6 Drawing Sheets

TEST SYSTEM

CROSS-REFERENCE TO RELATED APPLICATION

This application claims priority to Chinese patent applications No. 202010478440.3 and No. 202020953487.6, filed on May 29, 2020, which are hereby incorporated by reference in their entirety.

TECHNICAL FIELD

The present application relates to a technical field of data processing, and particularly to a technical field of detection devices.

BACKGROUND

When to-be-tested terminals such as smart speakers and smart televisions are to be tested, in order to improve the test efficiency, a plurality of wireless routers are usually adopted to test several to-be-tested terminals simultaneously.

SUMMARY

The present application provides a test system to solve or alleviate one or more technical problems in the prior art.

According to one aspect of the present application, there is provided a test system, comprising:

a signal shielding box;

at least one test unit disposed in the signal shielding box; the test unit comprising a first router and at least one to-be-tested terminal in wired connection with the first router, so that the to-be-tested terminal performs a signal transmission with the first router in a wired manner;

a control terminal in wired connection with the first router, configured to transmit test data to the to-be-tested terminal through the first router and receive a test result fed back from the to-be-tested terminal; and a server in wired connection with the first router, configured to receive to-be-identified information generated based on the test data and transmitted by the to-be-tested terminal through the first router, and feed a corresponding identification result back to the to-be-tested terminal through the first router.

It should be understood that the content described in this section is intended neither to identify the key or important features of the embodiments of the present application, nor to limit the scope of the present application. Other features of the present application will be easily understood from the following description.

BRIEF DESCRIPTION OF THE DRAWINGS

The accompanying drawings are provided for better understanding of the present application, rather than limiting it. In the drawings.

DETAILED DESCRIPTION OF THE EMBODIMENTS

Exemplary embodiments of the present application are described below with reference to the accompanying drawings, including various details of the embodiments of the present application to facilitate the understanding, and they should be considered as merely exemplary. Thus, it should be realized by those of ordinary skill in the art that various changes and modifications may be made to the embodiments described here without departing from the scope and spirit of the present application. Also, for the sake of clarity and conciseness, the well-known functions and structures are omitted in the following description.

Figure 1:
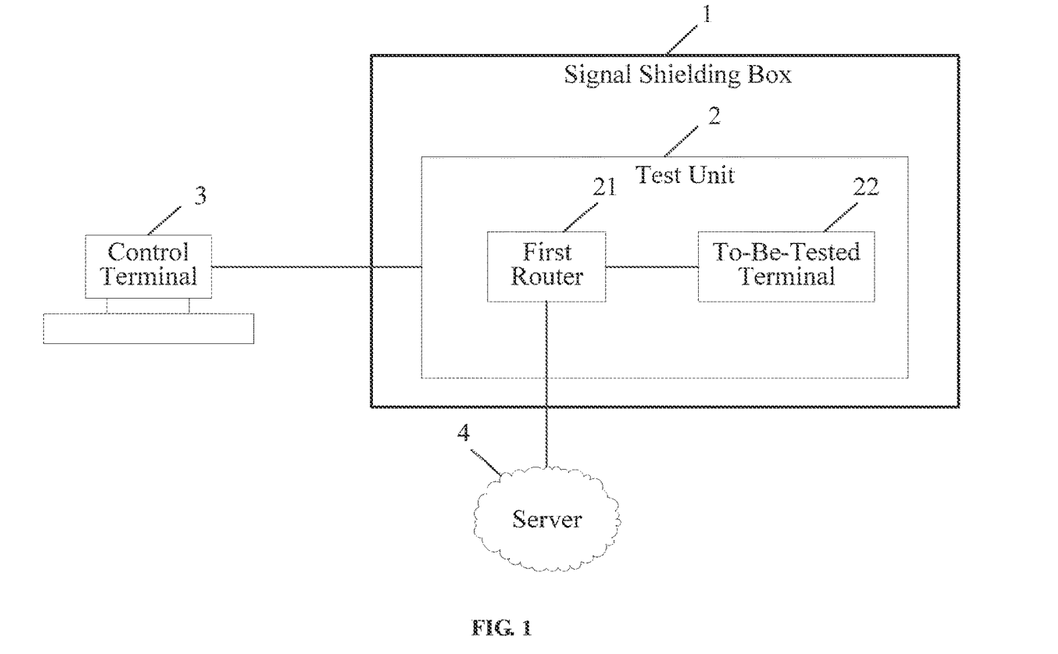
FIG. 1 is a schematic diagram of a test system according to an embodiment of the present application.

According to an embodiment of the present application, as shown in FIG. 1, the present application provides a test system comprising a signal shielding box 1, at least one test unit 2 disposed in the signal shielding box 1, a control terminal 3 and a server 4.

The signal shielding box 1 may be any device capable of realizing a signal shielding function in the prior art. The structure, size, shape and material of the box body of the signal shielding box 1 may be selected and adaptively adjusted according to test requirements. For example, the signal shielding box 1 may be made of a metal material, which may achieve a good signal shielding effect while reducing the cost.

The test unit 2 comprises at least one first router 21 and at least one to-be-tested terminal 22. The first router 21 is in wired connection with the to-be-tested terminal 22, so that the to-be-tested terminal 22 may perform a signal transmission with the first router 21 by means of the wired connection.

The first router 21 may be any router in the prior art, such as a router having a wired signal transmission function and/or a wireless signal transmission function. The to-be-tested terminal 22 may be any smart interaction device in the prior art, such as a smart speaker, a smart television, a smart alarm clock, a smart phone, a smart watch, etc. Any device needing to be tested through interactions of a large amount of data may be adopted as the to-be-tested terminal 22.

The control terminal 3 is in wired connection with the first router 21, and is configured to transmit test data to the to-be-tested terminal 22 through the first router 21 and receive a test result fed back from the to-be-tested terminal 22 through the first router 21, thereby realizing the signal transmission with the to-be-tested terminal 22 through the first router 21.

The control terminal 3 may be any terminal such as a computer, a mobile device or a console. The control terminal 3 is configured to transmit test data to the to-be-tested terminal 22, receive a test result fed back from the to-be-tested terminal 22 based on the test data, and monitor a test situation of the to-be-tested terminal 22. The control terminal 3 may be disposed outside or inside the signal shielding box 1.

The server 4 is in wired connection with the first router 21, and is configured to receive to-be-identified information generated based on the test data and transmitted by the to-be-tested terminal 22 through the first router 21, and feed a corresponding identification result back to the to-be-tested terminal 22 through the first router 21, thereby realizing a signal transmission with the to-be-tested terminal 22 through the first router 21.

The server 4 may comprise a local server or a cloud server. The server 4 is configured to analyze the to-be-identified information transmitted by the to-be-tested terminal 22 through the first router 21 and generate an analysis result. In a case that the server 4 is a local server, the server 4 may be disposed outside or inside the signal shielding box 1.

In this embodiment, since the first router 21 of the test unit 2 and the to-be-tested terminal 22 are placed in the signal shielding box 1, through the signal shielding box 1, the signal transmission between the first router 21 and the to-be-tested terminal 22 is effectively shielded from external signals. In addition, since the first router 21, the to-be-tested terminal 22, the control terminal 3 and the server 4 are in wired connections, the stability of the signal transmission is ensured, which solves the existing problems of unstable signal transmission and crosstalk with other wirelessly transmitted signals during signal transmission using wireless transmission technologies. Moreover, by adopting wired signal transmission, the problems such as network interruption, reconnection, and the like caused by preempting communication channel, which would be incurred in a case that the to-be-tested terminal transmits signals wirelessly, are avoided. In this embodiment, the control terminal 3 may stably transmit the test data to the to-be-tested terminal 22 by means of wired transmission via the first router 21, so that the test data may be completely received by the to-be-tested terminal 22. Meanwhile, the control terminal 3 may use the first router 21 to stably receive a complete test result generated by the to-be-tested terminal 22 based on the test data as well. In this embodiment, since the to-be-tested terminal 22 is in wired connection with the first router 21, the to-be-tested terminal 22 may completely transmit the to-be-identified information to the first router 21 without any interference from external signals, so that the first router 21 may accurately transmit the to-be-identified information to the server 4, thereby ensuring that the server 4 may accurately identify the to-be-identified information. Meanwhile, the server 4 may stably feed the identification result back to the to-be-tested terminal 22 by means of wired transmission via the first router 21.

In one example, the to-be-tested terminal 22 may be in wired connection with the wireless first router 21 through a radio frequency cable. Specifically, one end of the radio frequency cable is connected to a signal output end of the wireless first router 21, and the other end of the radio frequency cable is connected to a signal input end of the to-be-tested terminal 22. With the connection mode of this embodiment, the wireless signal of the first router 21 may be transmitted to the to-be-tested terminal 22 in a wired manner, which improves the stability of signal transmission and avoids the problem of signal interference suffered by wireless signal transmission. Therefore, the to-be-tested terminal 22 may perform stable signal transmission and data interaction with other devices through the wireless first router 21.

In one application example, the first router 21 may transmit voice test data to a smart speaker by means of wired transmission, so that the smart speaker may identify the voice test data locally. After completing the identification of the voice test data, the smart speaker generates a test result and transmits it to the first router 21 by means of wired transmission. Here, the voice test data may be transmitted by other terminals to the first router 21, and the first router 21, upon receiving the test result, may further transmit it to other terminals.

In one application example, the first router 21 may transmit the voice test data to a smart alarm clock by means of wired transmission, so that the smart alarm clock may identify the voice test data locally. After completing the identification of the voice test data, the smart alarm clock generates a test result and transmits it to the first router 21 by means of wired transmission. Here, the voice test data may be transmitted by other terminals to the first router 21, and the first router 21, upon receiving the test result, may further transmit it to other terminals.

In one application example, the control terminal 3 transmits the voice test data required by the smart speaker to the wireless first router 21, and the wireless first router 21 transmits the voice test data to the smart speaker through a radio frequency cable. After receiving the voice test data, the smart speaker uses its own voice recognition module to process the voice test data, and transmits a test result obtained by processing the data to the wireless first router 21 through the radio frequency cable, and the wireless first router 21, upon receiving the test result, transmits it to the control terminal 3. According to the received test result, the control terminal 3 determines whether the voice recognition result of the tested smart speaker meets preset indexes. The preset indexes may comprise voice recognition accuracy, data processing speed, etc.

In one application example, the control terminal 3 transmits the voice test data required by a smart phone to the wireless first router 21, and the wireless first router 21 transmits the voice test data to the smart phone through a radio frequency cable. After receiving the voice test data, the smart phone uses its own voice recognition module to process the voice test data, and transmits a test result obtained by processing the data to the wireless first router 21 through the radio frequency cable, and the wireless first router 21, upon receiving the test result, transmits it to the control terminal 3. According to the received test result, the control terminal 3 determines whether the voice recognition result of the tested smart phone meets preset indexes. The preset indexes may comprise voice recognition accuracy, data processing speed, etc.

In one application example, the control terminal 3 transmits the voice test data "what day is it today?" to the wireless first router 21, and the wireless first router 21 transmits the voice test data to the smart speaker by means of wired transmission. The smart speaker processes the test voice to generate and transmit to-be-identified information to the wireless first router 21 by means of wired transmission. The wireless first router 21 transmits the to-be-identified information to the server 4, and the server 4 analyzes the to-be-identified information and generates the identification result "Today is Monday." The server 4 transmits the identification result to the wireless first router 21, and the wireless first router 21 transmits the identification result to the smart speaker by means of wired transmission. According to the received to-be-identified information, the smart speaker generates the voice interaction information "Today is Monday" and transmits the voice interaction information as a test result to the wireless first router 21 by means of wired transmission, and then the wireless first router 21 transmits the test result to the control terminal 3.

In one application example, the control terminal 3 transmits the voice test data "what day is it today?" to the wireless first router 21, and the wireless first router 21 transmits the voice test data to a smart watch by means of wired transmission. The smart watch processes the test voice to generate and transmit to-be-identified information to the wireless first router 21 by means of wired transmission. The wireless first router 21 transmits the to-be-identified information to the server 4, and the server 4 analyzes the to-be-identified information and generates the identification result "Today is Monday." The server 4 transmits the identification result to the wireless first router 21, and the wireless first router 21 transmits the identification result to the smart watch by means of wired transmission. According to the received to-be-identified information, the smart watch generates the voice interaction information "Today is Monday" and transmits the voice interaction information as a test result to the wireless first router 21 by means of wired transmission, and then the wireless first router 21 transmits the test result to the control terminal 3.

Figure 2:
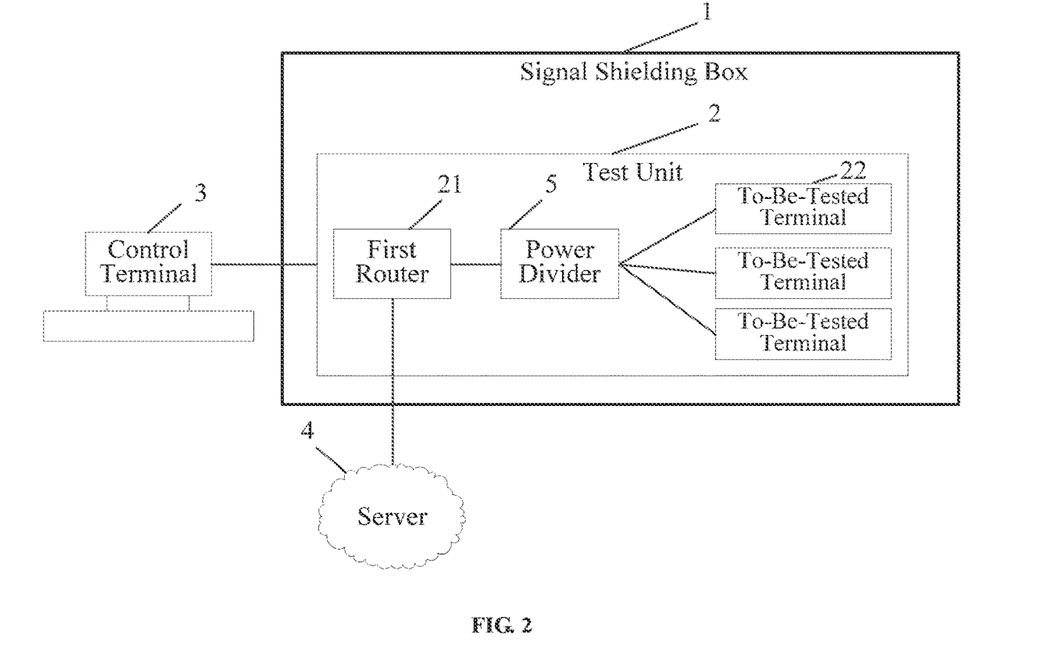
FIG. 2 is a schematic diagram of a test system according to another embodiment of the present application.

In one embodiment, as shown in FIG. 2, the test system further comprises a power divider 5. The power divider 5 has at least one signal input end in wired connection with a signal output end of the first router 21, and a plurality of signal output ends in wired connection with one of the to-be-tested terminals 22 respectively.

The plurality of signal output ends of the power divider 5 are in wired connection with one of the to-be-tested terminals 22 respectively, which may be understood as that some or all of the signal output ends of the power divider 5 are connected to one of the to-be-tested terminals 22 respectively. The signal output end needing to be connected to the to-be-tested terminals 22 may be selected and adjusted according to the number of the to-be-tested terminals 22.

In this embodiment, the expansion of the signal output end of the first router 21 may be realized by the power divider 5, so that the first router 21 may be connected to more to-be-tested terminals 22 by means of wired transmission, thereby improving the overall test efficiency of the test system while ensuring the signal transmission stability of each of the to-be-tested terminals 22, so as to increase the test accuracy while improving the test efficiency.

In one embodiment, the power divider 5 is a radio frequency power divider.

In one embodiment, the power divider 5 comprises a plurality of the power dividers 5 connected in cascade. The signal input end of the power divider 5 at a first hierarchy is in wired connection with the signal output end of the first router 21, and at least some of the signal output ends of the power dividers 5 at other hierarchies are in wired connection with one of the to-be-tested terminals 22 respectively.

In this embodiment, since there are a plurality of power dividers 5 in cascade, the signal output end of the first router 21 may be further expanded, so that the first router 21 may be connected to several to-be-tested terminals 22 by means of wired transmission, thereby improving the overall test efficiency of the test system while ensuring the signal transmission stability of each of the to-be-tested terminals 22, so as to increase the test accuracy while improving the test efficiency.

Figure 3:
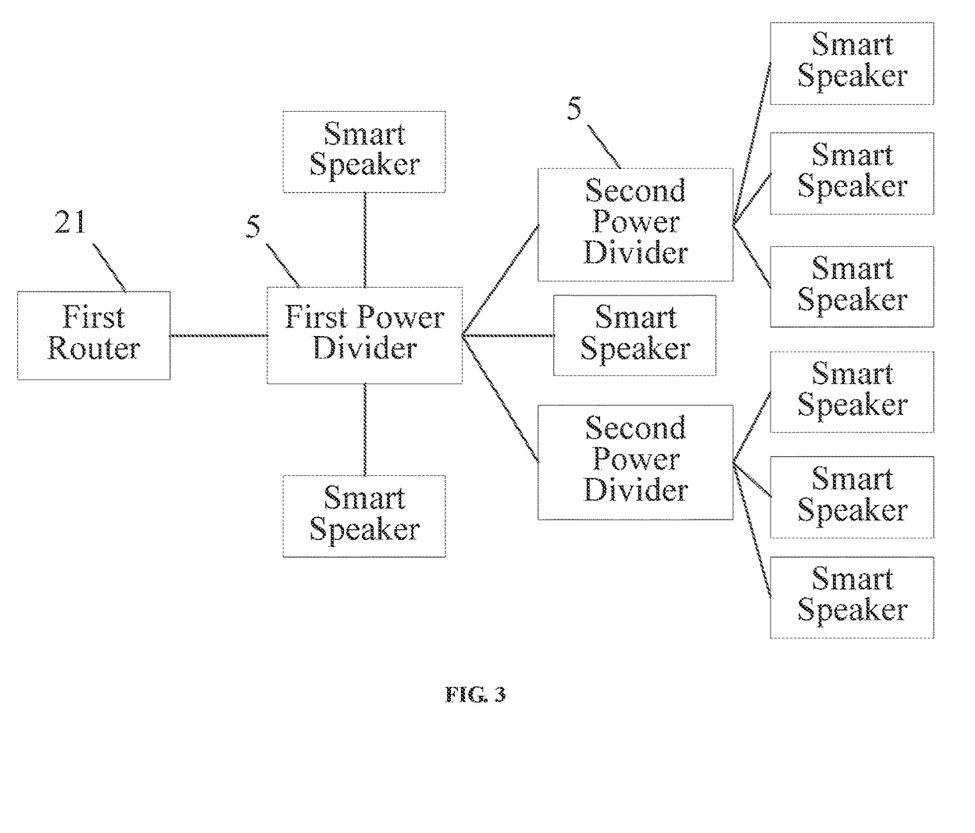
FIG. 3 is a schematic diagram of a test unit according to an embodiment of the present application.

In one application example, as shown in FIG. 3, the signal output end of the first router 21 is connected to a signal input end of a first power divider 5, at least two signal output ends of the first power divider 5 are connected to the signal input end of one of the second power dividers 5 respectively, and the remaining signal output ends of the first power divider 5 are connected to one of the smart speakers respectively. A plurality of signal output ends of each of the second power dividers 5 are connected to one of the smart speakers respectively.

Figure 4:
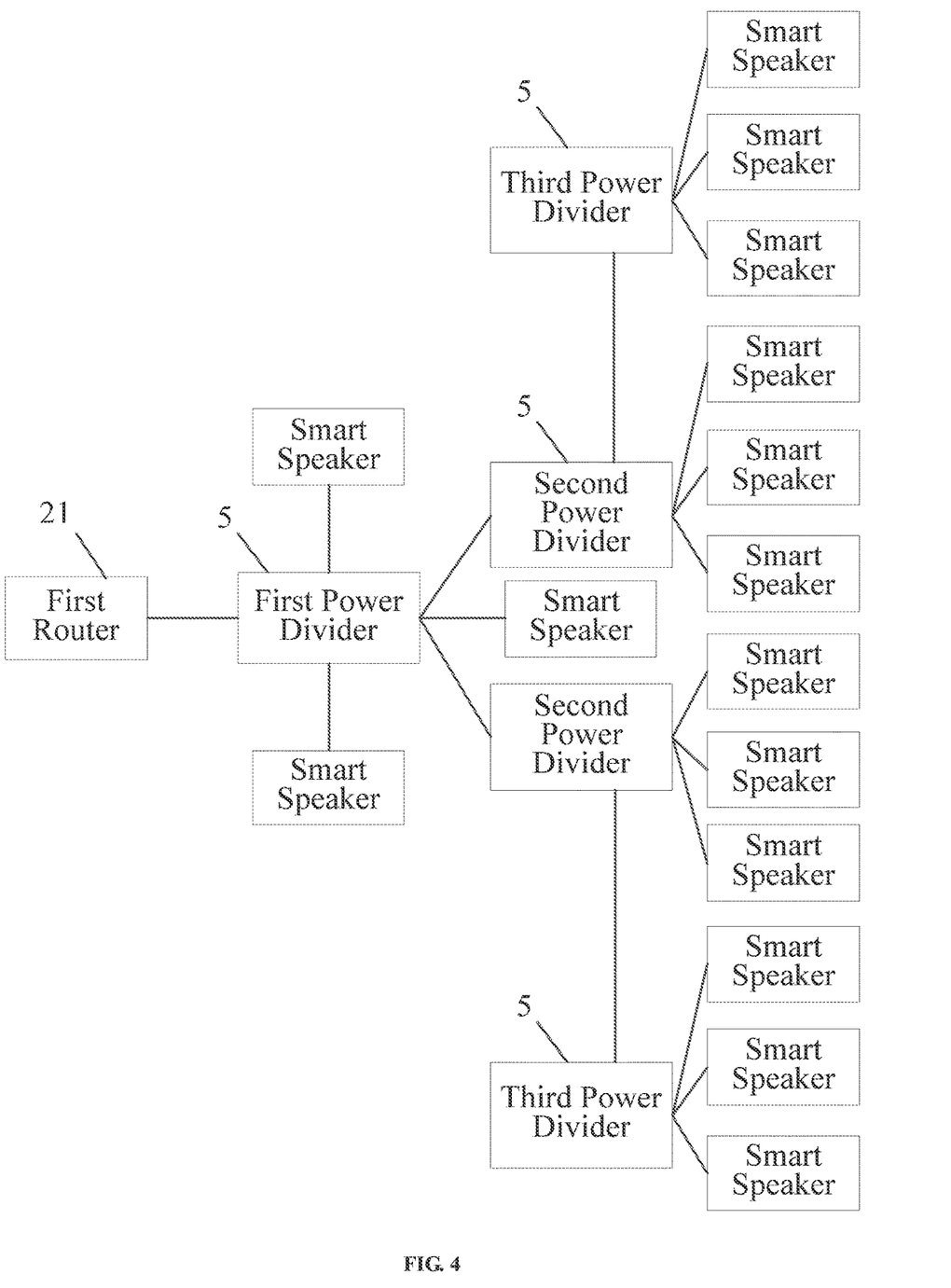
FIG. 4 is a schematic diagram of a test unit according to another embodiment of the present application.

In another application example, as shown in FIG. 4, the signal output end of the first router 21 is connected to the signal input end of a first power divider 5, at least two signal output ends of the first power divider 5 are connected to the signal input end of one of the second power dividers 5 respectively, and the remaining signal output ends of the first power divider 5 are connected to one of the smart speakers respectively. A plurality of signal output ends of each of the second power dividers 5 are connected to one of the smart speakers respectively. Some of the signal output ends of some of the second power dividers 5 are connected to the signal input end of one of the third power dividers 5 respectively. A plurality of signal output ends of the third power divider 5 are connected to one of the smart speakers respectively.

Figure 5:
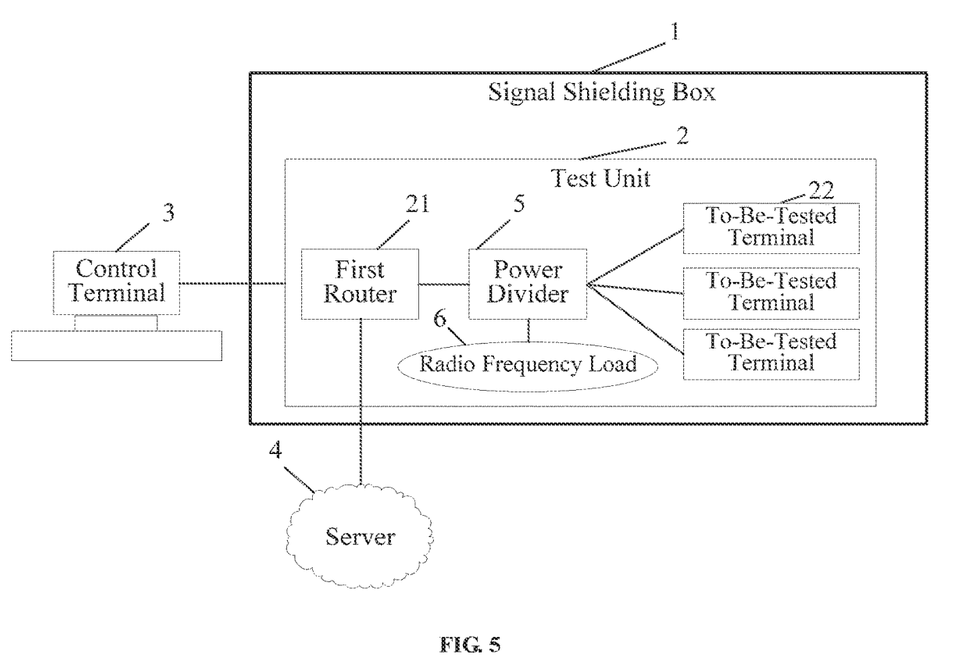
FIG. 5 is a schematic diagram of a test system according to yet another embodiment of the present application.

In one embodiment, as shown in FIG. 5, the test system further comprises a radio frequency load 6 connected to an idle signal output end of the power divider 5, thereby avoiding the signal leakage at the idle signal output end.

The radio frequency load 6 may be any radio frequency load device in the prior art, and may be selected and adjusted according to the requirement of the test system, which is not specified here. For example, the radio frequency load 6 may be of 50 ohms.

Figure 6:
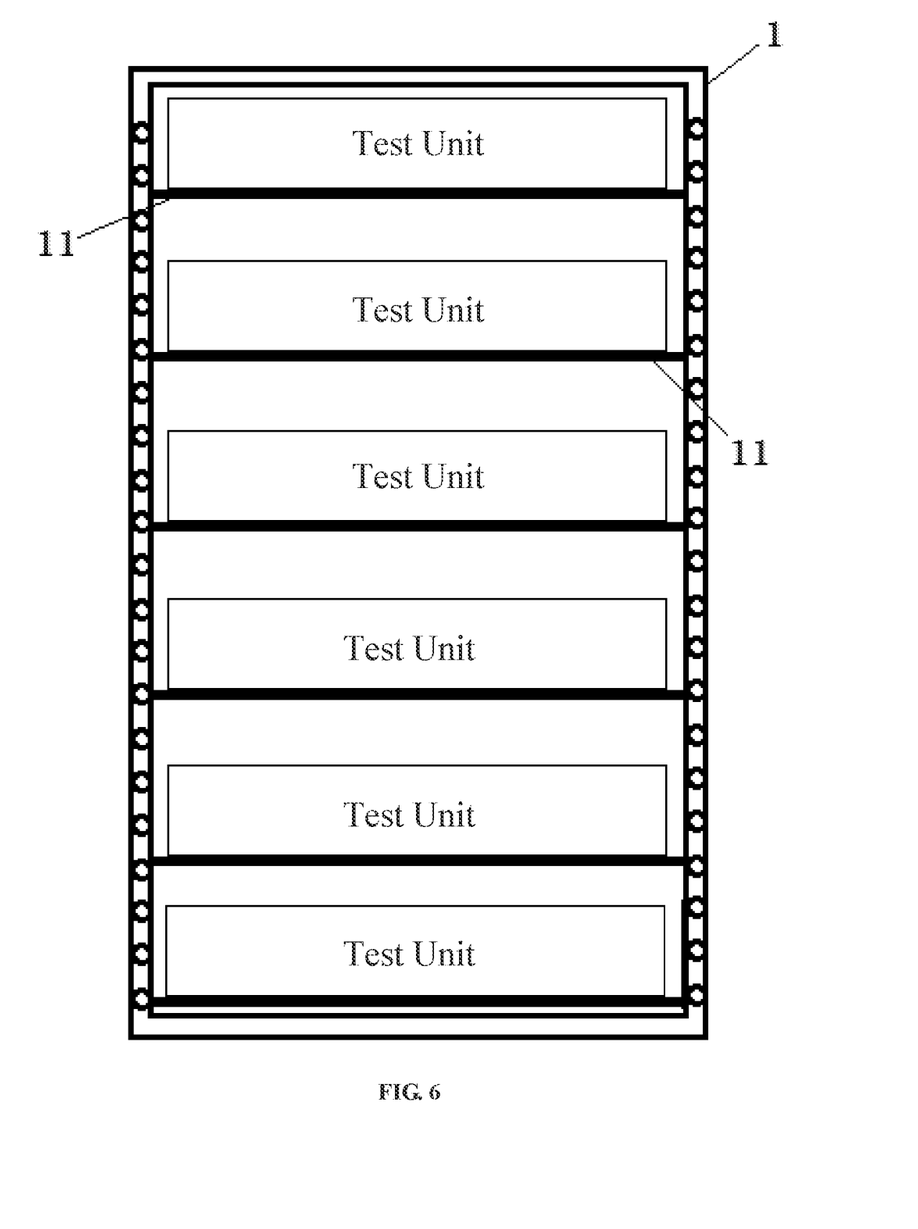
FIG. 6 is a schematic diagram of a test system according to yet another embodiment of the present application.

In one embodiment, as shown in FIG. 6, there are a plurality of the test units 2 disposed in the signal shielding box 1 at intervals, and a signal shielding partition 11 is disposed between adjacent two of the test units 2.

In this embodiment, since the plurality of test units 2 are all disposed in one signal shielding box 1 and the signal shielding partitions are disposed therebetween, it ensures that no crosstalk occurs in the signal transmission between the test units 2 while saving the space occupied by the test system. This not only improves the test performance of the test system, but also increases the space utilization rate of a test site. Meanwhile, in this embodiment, the secondary shielding of signals may be realized: the primary shielding of external signals during the signal transmission may be realized by means of the wired connection between the first router 21 and the to-be-tested terminal 22, and the secondary shielding of external signals may be realized using the signal shielding box 1, thereby ensuring the test stability and test result accuracy of each of the to-be-tested terminals 22.

In one example, the signal shielding boxes 1 are disposed vertically at a test site, the test units 2 are disposed at intervals along the height direction of the signal shielding box 1, and a signal shielding partition is disposed between adjacent two of the signal shielding boxes 1. Each of the test units 2 may be fixedly connected to the signal shielding partition therebelow, and may be fixedly mounted in the signal shielding box 1 through the signal shielding partition.

Figure 7:
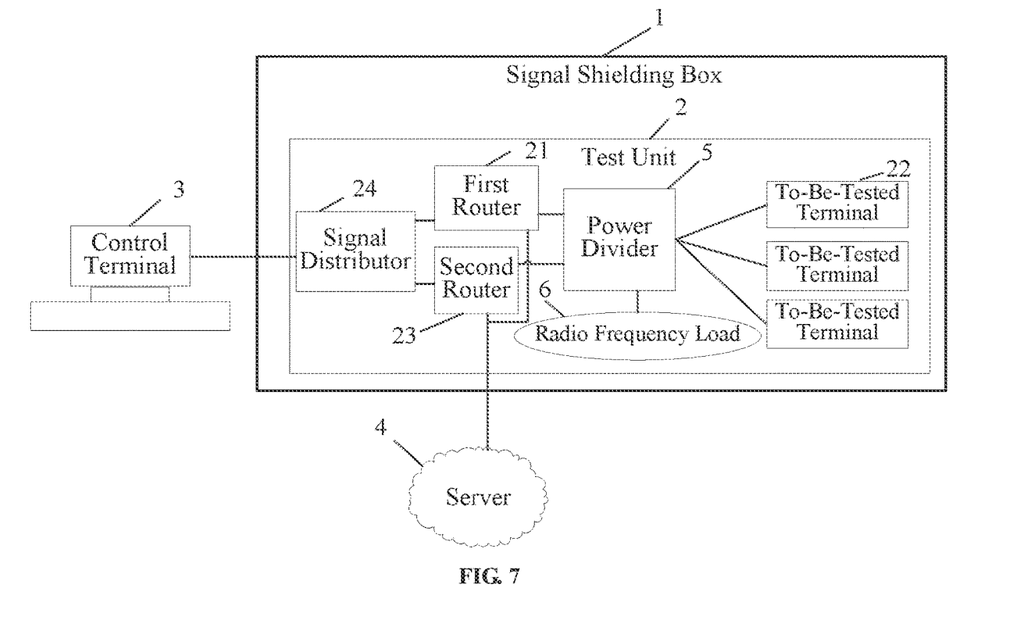
FIG. 7 is a schematic diagram of a test system according to yet another embodiment of the present application.

In one embodiment, as shown in FIG. 7, the test unit further comprises a second router 23 and a signal distributor 24. The second router 23 is in wireless connection with the to-be-tested terminal 22 and in wired connection with the server 4. The second router 23 may realize the signal transmission between the control terminal 3 and the to-be-tested terminal 22 in a wireless manner. The signal distributor 24 is in wired connection with the control terminal 3, the first router 21 and the second router 23.

The signal distributor 24 may be configured to detect the wireless signal intensity of the second router 23. The signal distributor 24 may further be configured to distribute a signal transmitted by the control terminal 3 to the first router 21 or the second router 23, so that the control terminal 3 may perform a signal transmission with the to-be-tested terminal 22 by means of wired or wireless transmission. The second router 23 may be configured to realize the signal transmission between the control terminal 3 and the to-be-tested terminal 22, as well as the signal transmission between the to-be-tested terminal 22 and the server 4. That is, the second router 23 has the same function as the first router 21.

In one application example, the control terminal 3 uses the signal distributor 24 and the second router 23 to wirelessly transmit the test data to the to-be-tested terminal 22 for the test thereof. When the wireless signal transmission between the second router 23 and the to-be-tested terminal 22 is detected as being weak, the signal distributor 24 transmits new test data to the to-be-tested terminal 22 through the first router 21 upon receiving the new test data transmitted by the control terminal 3, thereby transmitting the test data transmitted by the control terminal 3 to the to-be-tested terminal 22 by means of wired transmission.

In this embodiment, by detecting the wireless signal intensity through the signal distributor 24, in a case that the wireless signal is weak, it may switch to the wired signal transmission between the to-be-tested terminal 22 and the control terminal 3, thereby ensuring the stability of the test process and enabling the to-be-tested terminal 22 to smoothly complete the subsequent test processes.

In the present application, unless otherwise specified or limited, terms "mount," "link," "connect," "fix," etc. should be understood in the broad senses, for example, may be a fixed connection, a detachable connection or integration; may be a mechanical connection, an electrical connection or communication; and may be a direction connection, an indirect connection through an intermediate medium, or internal communication between two elements or an interaction therebetween. For those of ordinary skill in the art, the specific meanings of the above terms in the present application may be understood according to specific circumstances.

In the present application, unless otherwise specified or limited, a first feature being "on" or "under" a second feature indicates not only a direct contact between the first and second features, but also an indirect contact therebetween through another feature. Further, the first feature being "on," "above," or "over" the second feature indicates that the first feature is directly or obliquely above the second feature, or simply means that the first feature is higher in level than the second feature. The first feature being "under," "below," or "beneath" the second feature indicates that the first feature is directly or obliquely below the second feature, or simply means that the first feature is lower in level than the second feature.

Those specific embodiments do not limit the protection scope of the present application. It should be understood by those skilled in the art that various modifications, combinations, sub-combinations and replacements may be made according to the design requirements and other factors. Any modification, equivalent replacement and improvement made under the spirit and principle of the present application should fall within the protection scope of the present application.

What is claimed is:

1. A test system, comprising:
    a signal shielding box;
    at least one test unit disposed in the signal shielding box;
        the test unit comprising a first router and at least one to-be-tested terminal in wired connection with the first router, so that the to-be-tested terminal performs a signal transmission with the first router in a wired manner;
    a control terminal in wired connection with the first router, configured to transmit test data to the to-be-tested terminal through the first router and receive a test result fed back from the to-be-tested terminal, and
    a server in wired connection with the first router, configured to receive to-be-identified information generated based on the test data and transmitted by the to-be-tested terminal through the first router, and feed a corresponding identification result back to the to-be-tested terminal through the first router;
    wherein the test system further comprises:
    a power divider having at least one signal input end in wired connection with a signal output end of the first router, and a plurality of signal output ends in wired connection with one of the at least one to-be-tested terminal respectively;
    wherein the at least one power divider comprises a plurality of power dividers connected in cascade, the signal input end of the power divider at a first hierarchy is in wired connection with the signal output end of the first router, and at least some of the signal output ends of the power dividers at other hierarchies are in wired connection with one of the at least one to-be-tested terminal respectively.

2. The test system according to claim 1, wherein the at least one test unit comprises a plurality of test units disposed in the signal shielding box at intervals, and a signal shielding partition is disposed between adjacent two of the test units.

3. The test system according to claim 1, further comprising:
    a radio frequency load connected to an idle signal output end of the power divider.

4. The test system according to claim 1, wherein the test unit further comprises:
    a second router in wireless connection with the to-be-tested terminal, so that the to-be-tested terminal performs a signal transmission with the second router in a wireless manner; the second router further being in wired connection with the server, so as to transmit the to-be-identified information generated by the to-be-tested terminal based on the test data to the server and feed the corresponding identification result fed by the server back to the to-be-tested terminal; and
    a signal distributor in wired connection with the control terminal, the first router and the second router, configured to detect wireless signal intensity of the second router, and according to a detection result, determine to use the first router or the second router to perform a signal transmission with the to-be-tested terminal.

5. The test system according to claim 1, wherein the first router is a wireless router.

6. The test system according to claim 1, wherein the to-be-tested terminal comprises a smart interaction device.

7. The test system according to claim 1, wherein the first router is in wired connection with the to-be-tested terminal, the control terminal and the server through a radio frequency cable.

8. The test system according to claim 1, wherein the signal shielding box is made of a metal material.

* * * * *